United States Patent

[11] 3,628,132

[72] Inventors Richard L. Fussell
Chester Springs;
Clifford J. Bader, West Chester, both of Pa.
[21] Appl. No. 872,967
[22] Filed Oct. 31, 1969
[45] Patented Dec. 14, 1971
[73] Assignee Burroughs Corporation
Detroit, Mich.

[54] THIN MAGNETIC FILM MAGNETOMETER WITH ZERO-FIELD REFERENCE
15 Claims, 9 Drawing Figs.
[52] U.S. Cl. ..................................................... 324/43 R
[51] Int. Cl. ....................................................... G01r 33/02
[50] Field of Search .......................................... 324/43, 47

[56] References Cited
UNITED STATES PATENTS
3,400,328 9/1968 Penn et al. ..................... 324/43

Primary Examiner—Rudolph V. Rolinec
Assistant Examiner—R. J. Corcoran
Attorney—Carl Fissell, Jr.

ABSTRACT: A circuit technique is described for use with a mangetometer employing a thin magnetic film sensor in an inductance-variation mode, to provide an accurate determination of the absolute value of an external applied field. The technique includes the use of switching means coupled to the thin magnetic film for periodically reversing the state or sense of the film. In the absence of an external field, that is, with zero applied field, the magnetometer output remains at a constant reference level. In the presence of an external field, the magnetometer output is an alternating current signal having an amplitude proportional to the field magnitude and a phase corresponding to the polarity or direction of the field.

Patented Dec. 14, 1971

INVENTORS
RICHARD L. FUSSELL
CLIFFORD J. BADER

BY Francis A. Varallo
AGENT

INVENTORS.
RICHARD L. FUSSELL
CLIFFORD J. BADER
BY Francis A. Varallo
AGENT

THIN MAGNETIC FILM MAGNETOMETER WITH ZERO-FIELD REFERENCE

CROSS REFERENCES TO RELATED APPLICATIONS

Although not limited thereto, the technique for establishing a zero-field reference may be applied to the thin film magnetometers described and claimed in the following applications: (1) Ser. No. 449,183, which is U.S. Pat. No. 3,416,072, "Thin Film Magnetometer Employing Phase Shift Discrimination" by Richard L. Fussell and Clifford J. Bader and, (2) Ser. No. 543,097, now U.S. Pat. No. 3,443,213, "Magnetometer Using Thin Film Transducer as Slope Detection Filter" by Clifford J. Bader, Richard L. Fussell and Arthur G. Barnett. Each of these patents is assigned to the same assignee as the present application.

BACKGROUND OF THE INVENTION

The magnetic film inductance-variation magnetometers of the type described and claimed in the referenced patents offer the advantages of simplicity, mechanical ruggedness, compactness, and sensitivity with minimal power consumption for operation. These magnetometers are admirably suited for applications involving the sensing of changes in an external field environment. However, in their basic form, the devices do not provide the means for accurately determining the absolute value of the external field. Such a measurement would involve a determination of the deviation of the magnetometer output from the quiescent nonzero signal level corresponding to the absence of an external applied field. Unfortunately, the zero-field output signal from such magnetometers is influenced by many factors, including inductance and capacitance thermal and aging drifts, semiconductor junction voltages, the supply voltage, tank circuit Q, and external loading. Therefore, comparison with the nominal quiescent signal level is not a satisfactory means for obtaining an absolute field measurement.

An additional problem in the direct measurement of small fields using the aforementioned magnetometers in their basic form results from the necessity for high gain, and differential DC amplification. The differential signal may be on the order of 10 microvolts per gamma (1 gamma = $10^{-5}$ oersted), so that gamma-level measurements would require chopper stabilized DC amplification or its equivalent.

The present circuit technique, when applied to magnetometers of the type described in the reference patents, provides for the establishment of a magnetometer output which is unchanging under zero field conditions. At the same time, the technique provides an AC output signal suitable for stable high-gain amplification. The actual sensing of the external field by the magnetometers, involving thin magnetic films driven by radiofrequency fields in a nonswitching inductance-variation mode, remains unchanged by the addition of the present circuit means for establishing a zero-field reference.

SUMMARY OF THE INVENTION

In accordance with the present invention, circuit means are added to the basic magnetometer to periodically switch the magnetization state of the transducer thin film element. The switching or reversal of the film magnetization causes the polarity of the magnetometer output change for a given externally applied field to also be reversed. However if the externally applied field is zero, there is no output change upon magnetization state reversal.

When an external easy-axis field component is present, reversal of the film magnetization causes an output voltage change of approximately twice that produced by application and removal of the field component. If the thin magnetic film is switched at an audiofrequency rate, a square-wave output signal having a peak-to-peak amplitude proportional to the external applied easy-axis field, is generated by the magnetometer sensor. The output signal has a zero amplitude in the absence of external fields and undergoes a phase reversal when the sense or direction of the applied field is reversed.

Periodic film switching applied to the basic inductance-variation sensor provides a zero-field reference having an accuracy limited only by the degree to which the thin film properties are independent of magnetization vector sense. This independence is virtually complete provided that a single-domain state is maintained. Additionally, the present invention provides an AC output suitable for stable high-gain amplification; and the output is synchronous with the switching signal and therefore, may be synchronously detected. Phase detection may be used to determine applied field sense.

An important characteristic of the present invention is the separation of the switching and sensing operations. The thin film magnetization state is sensed in the intervals between successive switchings by small signal means which disturb, but do not alter, the state. Moreover, spurious signals generated during switching, such as Barkhausen noise, do not limit or effect the sensing operation.

DESCRIPTION OF THE PREFERRED EMBODIMENTS

Figure 1:
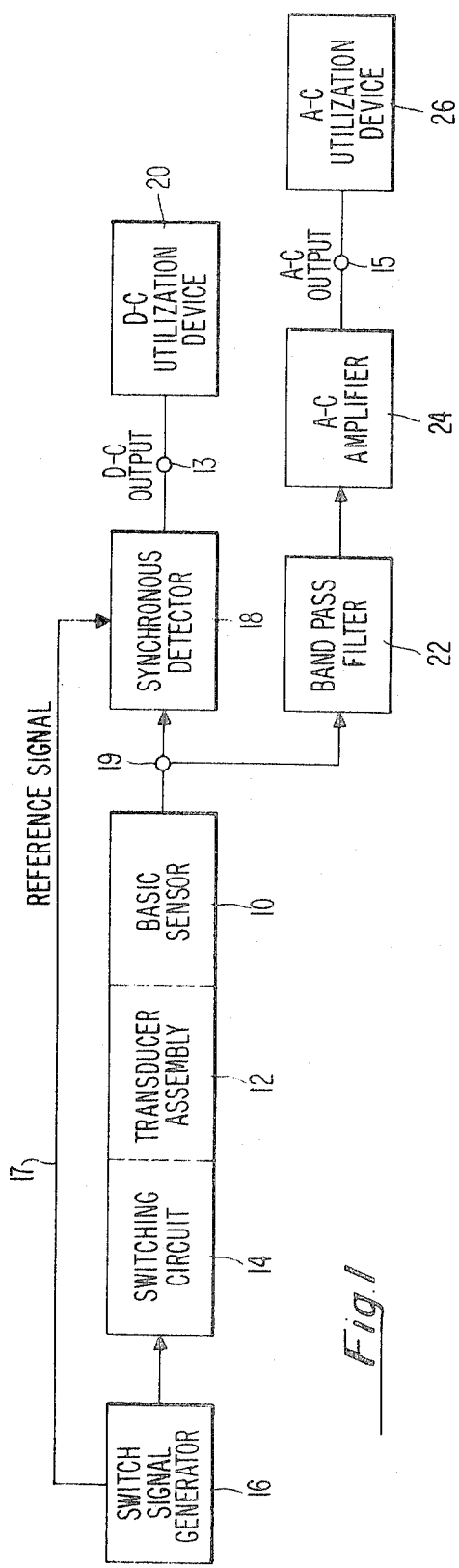
FIG. 1 is a block diagram depicting the organization of the zero-reference sensor system of the present invention.

FIG. 1 illustrates the combination of a magnetometer basic sensor 10 of the type referenced hereinbefore with a switching circuit 14 to provide the zero-reference magnetometer sensor of the present invention. The transducer assembly 12 which includes the magnetic thin film element and the windings coupled thereto is common to the switching circuit 14 and the basic sensor 10. Also illustrated in FIG. 1 are a switch signal generator 16 coupled to the switching circuit to provide the desired switching frequency, and various output circuit coupled to the basic sensor. The latter circuits include a synchronous detector 18 and a utilization device 20 for receiving the DC output therefrom, and a band-pass filter 22 and AC amplifier 24, together with a utilization device 26 for receiving the AC output signals from amplifier 24.

Figure 2:
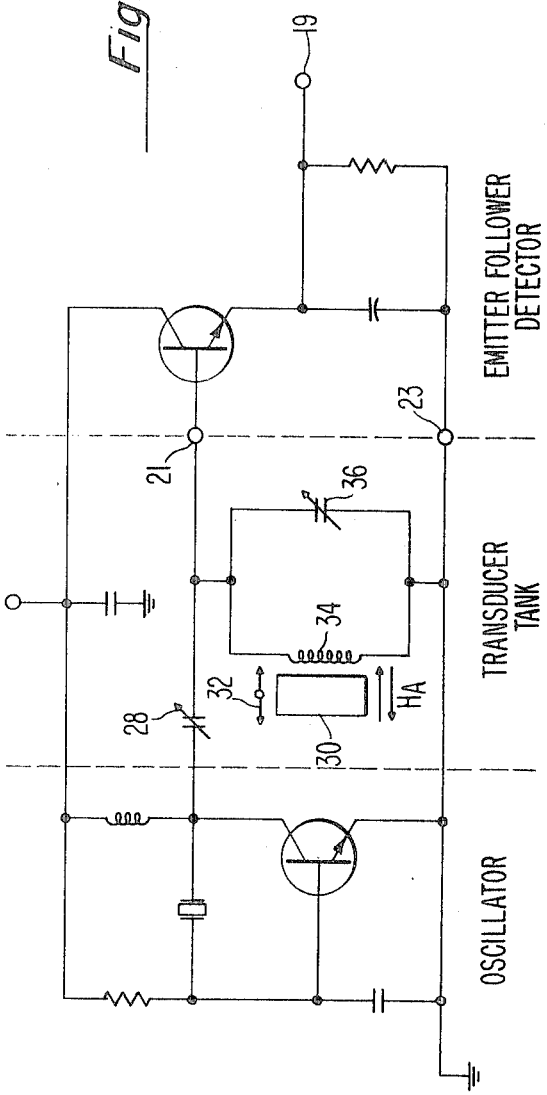
FIG. 2 is an electrical schematic of the slope-detection magnetometer of the referenced U.S. Pat. No. 3,443,213, which magnetometer may be used as the "basic sensor" in the system of FIG. 1.

As noted hereinbefore the present invention incorporates a basic magnetometer sensor of the inductance-variation type, examples of which are found in the referenced patents. FIG. 2 is a schematic diagram of the slope-detection magnetometer described and claimed in the U.S. Pat. No. 3,443,213. Before proceeding with the consideration of the system of FIG. 1, it is believed helpful to review in general the characteristics of the referenced inductance variation magnetometers, and in particular the circuit configuration of FIG. 2.

The thin film inductance-variation magnetometer uses a winding or coil inductively coupled to a thin magnetic film, as the inductive element in a tuned tank circuit. The film is oriented with respect to the coil such that the film hard axis of magnetization coincides with the coil axis. The small signal inductance of such a winding depends upon the amount of coherent film-flux rotation produced by a given coil current. The presence of an external, easy-axis field constrains or enhances this rotation depending on its sense or polarity relative to the film magnetization sense. Thus, the inductance varies monotonically with easy axis fields not exceeding the film switching threshold.

In operation, the thin film magnetization is subjected to carefully controlled perturbations which are incapable of reversing or switching the magnetization state. Because of this, both the drive requirements and the inherent noise level are very low. In order to obtain induced voltages with reasonable amplitudes in spite of the extremely small flux changes available, the inductance variation transducer is generally operated at radio frequencies. For example, in an actual operative sensor, the transducer has an inductance of about 1.5 microhenries, with 10 percent of the inductance contributed by the film, and is capable of developing about 2 volts peak at 11 mHz without excessive disturbance of the film magnetization.

In FIG. 2, the basic sensor utilizes a crystal-controlled Pierce oscillator, loosely coupled to the transducer tank circuit by way of a small variable capacitor 28. The transducer tank circuit includes a thin magnetic film 30 having its easy or preferred axis oriented parallel with the double-headed arrow 32. The tank circuit also includes a capacitor 36 and an RF inductor 34 wound about the film and having its coil axis oriented transverse to the easy axis. The arrows labeled $H_A$ indicate the respective directions of an external magnetic field component parallel with the thin film easy axis. The transducer tank circuit is tuned so that the oscillator frequency falls on the slope of the resonance curve. As the transducer inductance varies with the external applied field, the tuning point shifts and the voltage developed across the tank varies proportionately. The signal appearing on the tank circuit is the same as that of the oscillator, typically in the 10 MHz region. A detector utilizing a transistor connected as an emitter follower, converts the RF tank signal to an equivalent DC voltage which appears on terminal 19.

In practice, with typical tuning and coupling adjustments, the detector output is about 1.8 volts at the resonance curve peak, and 1.1 volts with zero external field. The zero-field tuning point is chosen with the oscillator on the high-frequency side of the transducer resonance curve. This choice yields optimum linearity because the curvatures of the inductance versus field and impedance versus inductance characteristics tend to cancel. A total dynamic range of about 1 volt is obtained. With a thin magnetic film having a value of anisotropy field, $H_k$, equal to 3 oersteds and a thickness of 1,500 Angstroms, the sensitivity at zero applied field is about 1.5 volts/oersted, and the useful field range is about $\pm 0.33$ oersted. If the applied easy-direction field exceeds the film coercive force, $H_c$, and has a sense opposing that of the film magnetization, the film will be demagnetized or its magnetization sense reversed. Thus, the magnetometer characteristics are nonvolatile only for external fields less then $H_c$. The magnetometer may be made nonvolatile and the dynamic range greatly increased by the addition of an easy-axis biasing field. The externally supplied bias field produces an effect on inductance variation which may be considered equivalent to increasing the film $H_k$. Both the film contributed inductance and the inductance variation with applied field are inversely proportional to $H_k$, so that the sensitivity is inversely proportional to the square of the sum of $H_k$ and the biasing field. Another advantage of the bias field is that although a large external opposing field will still switch the film to its opposite remanent state, the original state will be restored by the bias field immediately upon removal of the disturbance, and the sensor characteristics will be nonvolatile.

Figure 3:
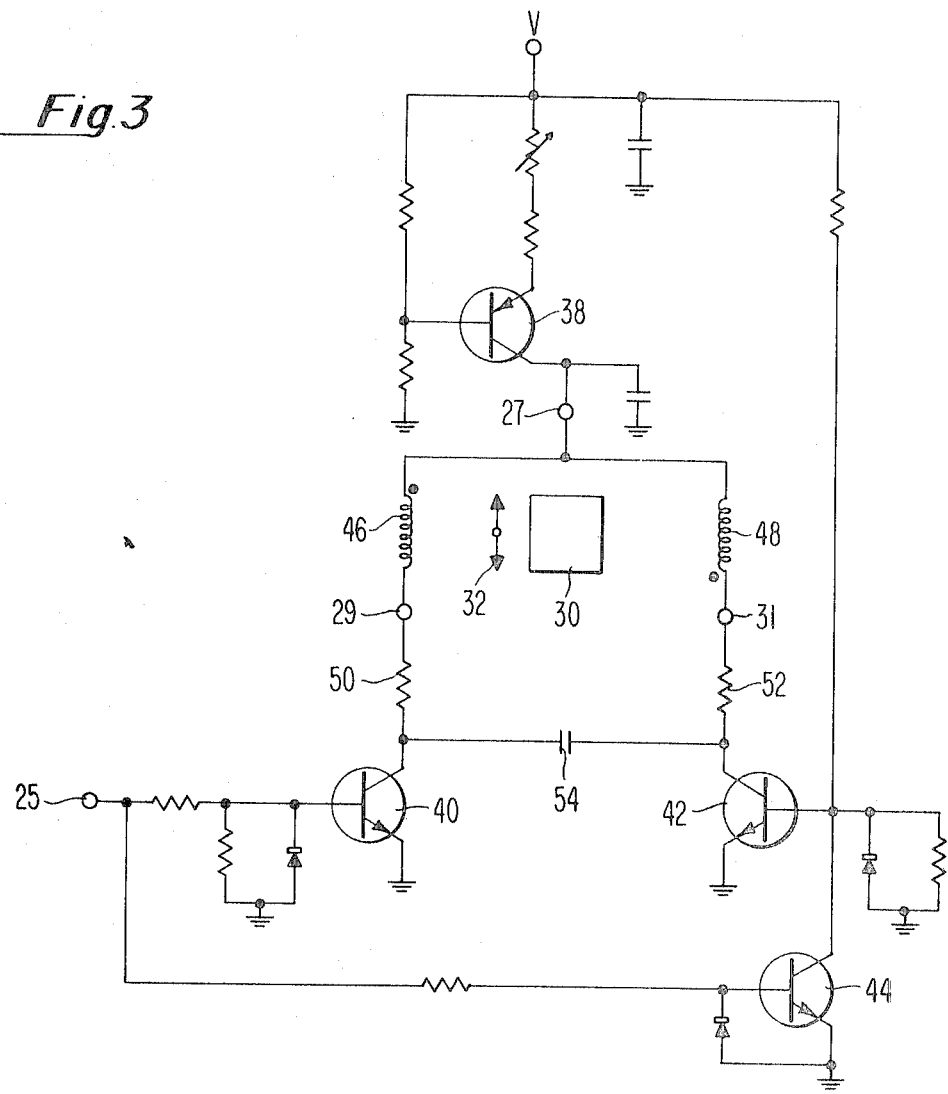
FIG. 3 is an electrical schematic of a "switching cricuit" suitable for use in the sensor system of FIG. 1.

FIG. 3 illustrates a switching circuit suitable for use with the basic sensor of FIG. 2, to produce the zero field reference magnetometer of the present invention. It should be understood that other types of switching circuits well within the skill of the electronic circuit designer may also be used with satisfactory results.

The circuit of FIG. 3 comprises a plurality of transistors - transistor 38 serves as a current source, transistors 40 and 42 as the current steering or switching transistors and transistor 44 as an inverter. As will be considered in greater detail, in FIG. 4, the thin film element 30 of the basic sensor has inductively coupled thereto a pair of windings or coils 46 and 48 which may be wound in bifilar fashion. The winding sense or polarity is indicated by conventional dot notation. Current flow through the coils generates respectively magnetic fields in opposite directions. These magnetic fields are applied to the thin film element and are of sufficient magnitude to switch the film from one remanent state to its opposite state.

In operation, the output of a switch signal generator (as shown in FIG. 1) which in practice may be a square wave of an approximate frequency, 400 Hz., is applied to input terminal 25 of the switching circuit of FIG. 3. The positive portion of the square-wave cycle is applied to the base of the switching transistor 40 and causes it to commence conduction. Current flows in a path from the DC supply, V, through the current source transistor 38 and into the dot terminal of winding 46, and through resistor 50 and transistor 40 to ground. During this positive half cycle of the input switch signal, the inverter 44 is in a conducting state because of the input signal on its base electrode and applies a negative pulse to the base of transistor 42. Transistor 42 is biased to nonconduction and current is prevented from flowing from source 38 through winding 48. Current flow through winding 46 causes a field to be applied to the thin film 30 along its easy axis and the film is switched to one of its stable states of magnetic flux remanence. A winding current of approximately 40 milliamperes, corresponding to a switched bias level of 3 oersteds, has been employed successfully.

In the succeeding negative half cycle, transistor 40 is rendered nonconductive, while transistor 42, through the action of inverter 44 commences conduction. Current flows through source transistor 38, and into the nondot terminal of winding 48, through resistor 52 and switching transistor 42 to ground. Current flow through winding 48 generates a magnetic field along the easy axis of the film 30 but opposite in direction to that generated by current through winding 46. In this manner the thin magnetic film is switched to the other of its stable remanent states. The nonconduction of transistor 40 during the negative half cycle prevents current flow through winding 46.

The advantages of biasing the thin film element mentioned hereinbefore apply as well to the switched zero-reference sensor. In addition, biasing tends to eliminate any residual domain-wall formation at the film edges, thus insuring the required single-domain state. In the magnetometer system of the present invention, it is necessary to reverse the bias field each time the film is switched. This may be accomplished by an electrically generated bias field in place of the permanent magnet bias which is usable in the basic sensor. If the bias field exceeds the film $H_c$, reversal of the bias switches the film, so that switching and biasing may be produced by the same windings. The switching circuit of FIG. 3 provides for biased operation.

One important requirement for biased switching is that the bias field magnitude be completely independent of its sense or direction. This requirement is met in FIG. 3 through the use of bifilar switching coils, by careful current regulation and with the use of low-leakage, current-steering circuits.

In the circuit of FIG. 3, the transistor current source 38 serves to maintain a field level independent of small differences in winding resistances and transistor saturation voltages. It should be noted that for applications requiring even greater stability, a feedback-type regulator could be used.

Current leakage through the steering transistors 40 and 42 is not compensated for by the current source. However, careful selection of high-quality transistors insures a proper zero reference. If a zero-bias switching system is suitable for a particular application, the problem of current leakage may be eliminated through transformer or capacitance coupling of the switching transistors to the switching coils. MOreover since no steady-state current is required in the nonbiased system, power requirements are considerably reduced.

To prevent transient oscillation in the switching windings and to minimize the disturbance produced by switching, the windings 46 and 48 are critically damped by capacitor 54. The resistors 50 and 52, which are each of the order of 51 ohms in an operating circuit, serve to isolate the oscillator radio-frequency signals induced in the switching windings.

It should be noted that during the film-switching interval, the inductance of the transducer increases as the switching threshold is reached, and then decreases to its original value as reversal becomes complete. This change produces a transient disturbance in magnetometer output. The magnitude and deviation of the transient is related to the switching time, the detection time constant and the tank-circuit Q. If the switching rate is low, the transient will have negligible effect on the filtered output. Moreover, since the transient polarity is not dependent on the direction of switching, the fundamental frequency of the transient spectrum is twice that of the switching signal, and transient effects may be eliminated on a frequency discrimination basis.

Figure 4:
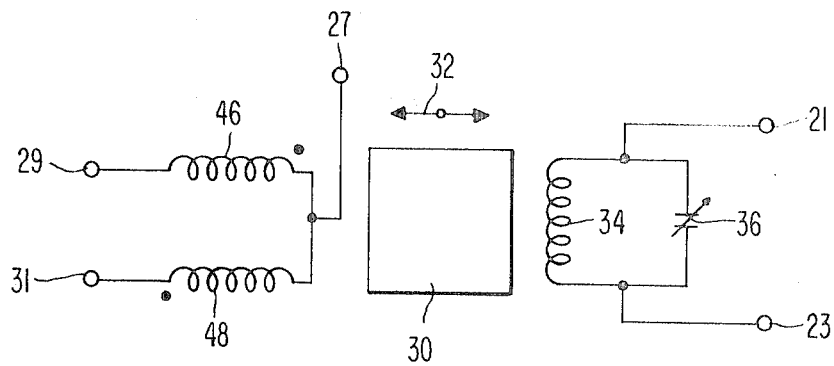
FIG. 4 illustrates an embodiment of the "transducer assembly" which is common to the basic sensor of FIG. 2 and the switching circuit of FIG. 3.

FIG. 4 illustrated a transducer assembly composed of the switching windings depicted in FIG. 3 and the tank circuit of FIG. 2. The terminals 27, 29 and 31 and the windings 46 and 48 correspond to those illustrated in FIG. 3; the terminals 21 and 23 on either side of the parallel tank circuit which includes RF winding 34 and capacitor 36 correspond to those in FIG. 2. The thin film element is identified by reference numeral 30 and the preferred direction of magnetization by the double-headed arrow 32.

In practice the switching windings 46 and 48 may be a bifilar coil of several hundred turns of wire wound at right angles to, and directly over, the RF transducer inductor. For example, an actual operative embodiment utilizes a 200-turn bifilar coil or solenoid of No. 31 Formvar-insulated wire, wound over a 22-turn RF inductor winding. The common axis of the switching windings is along the preferred direction of magnetization of the thin film element so that current flow through the windings generates an easy-axis field. With the arrangement of FIG. 4, switching of the film takes place by a domain wall process somewhat augmented by the rotational effect of the oscillator RF drive field. Although switching by domain-wall motion is inherently slow compared to coherent rotational switching, the time required for such switching, which may be on the order of 1 microsecond, is negligible compared to the interval between successive switchings permissible for most applications.

Figure 5:
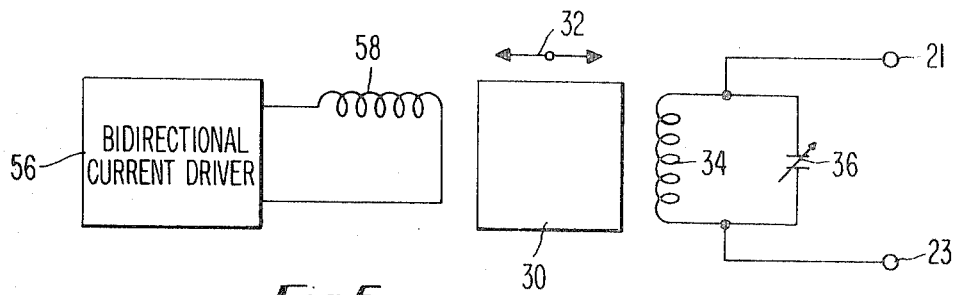
FIG. 5 illustrates another form of transducer assembly in which the switching circuit of FIG. 3 is replaced by a conventional bidirectional current driver.

FIG. 5 illustrates an alternate switching arrangement whereby the switching circuit of FIG. 3 is replaced by a bidirectional current driver 56 capable of selectively supplying current flow in opposite directions to a load. Such driver circuits are well known in the electronics art. The switching windings 46 and 48 of FIG. 4 are replaced in FIG. 5 by a single winding 58. Winding 58 is inductively coupled to the film 30 and has its coil axis oriented along the film easy axis 32. Current from driver 56 is made to flow first in one direction and then in the opposite direction through winding 58. As in the case of the FIG. 4 circuit, switching takes place by domain-wall motion.

Figure 6:
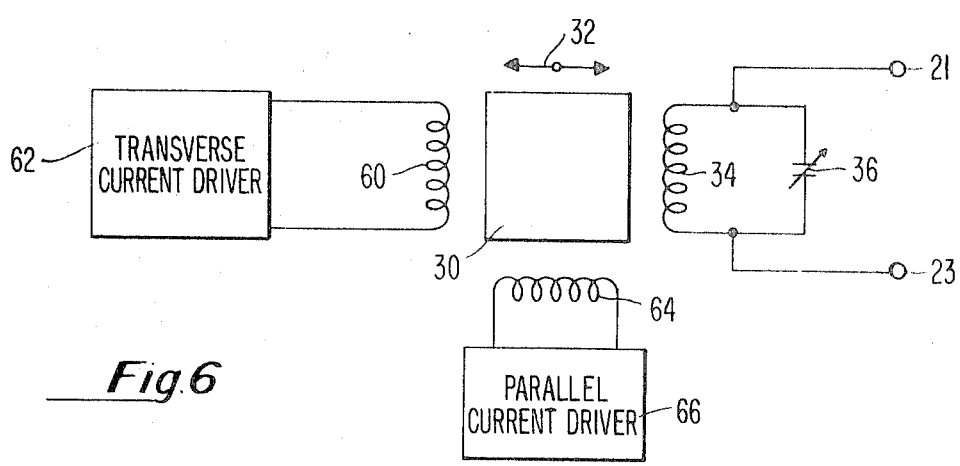
FIG. 6 depicts a third configuration of transducer assembly in which the switching circuit of FIG. 3 is replaced by a pair of current drivers.

FIG. 6 provides an alternate switching configuration which differs from those of FIGS. 4 and 5 in that the switching is by coherent rotation rather than domain-wall motion. Winding 60 is placed on the thin film element 30 with its coil axis along the hard direction be applied magnetization. A transverse current driver 62 provides current pulses through winding 60, thereby applying a hard direction field to the film. Winding 64 is oriented with respect to the thin film such that a pulse of current therethrough provided by parallel current driver 66 causes an easy-direction field to be applied to the film. The polarity of the current pulse provided by the parallel current driver determines the remanent state to which the film is being switched.

Figure 7:
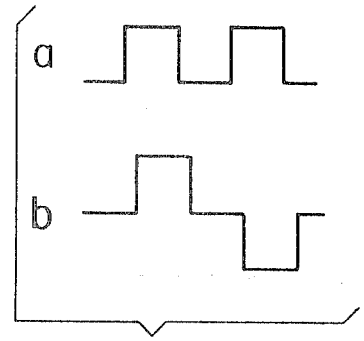
FIG. 7 depicts waveform diagrams showing the time relationship of the current pulses generated by the drivers of FIG. 6.

FIG. 7 depicts in simplified fashion the pulse waveforms provided by the current drivers 62 and 66, and $a$ pulses being generated by the transverse driver 62; the $b$ pulses, by parallel driver 66. By alternating the polarity of the $b$ pulses, as illustrated, the thin film element will be switched alternately from one remanent state to the opposite state. In order to switch the film, two magnetic fields perpendicular to each other, as generated by pulses $a$ and $b$, are applied in coincidence to the film. The resultant field lies between the hard and easy directions, oriented toward one or the other of the film stable states depending upon the direction of the parallel field. Removal of the transverse field ($a$ pulse) allows the film magnetic dipoles to fall to the desired state, after which the parallel field ($b$ pulse) can be terminated.

Figure 8:
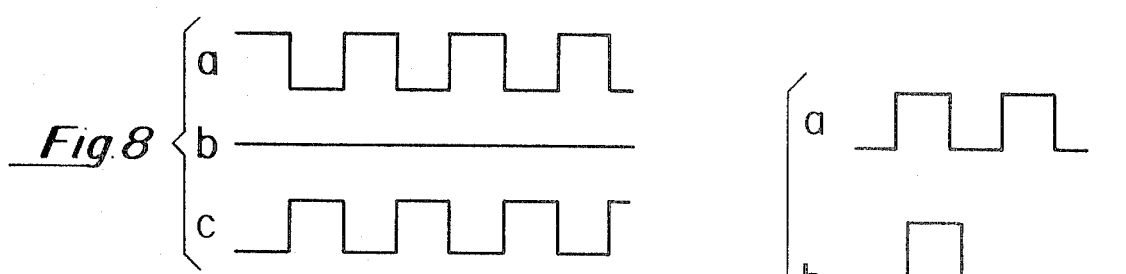
FIG. 8 illustrates in an idealized manner the waveforms of the signals appearing at the output of the basic sensor in the system of FIG. 1 for different conditions of the applied field.

FIG. 8 represents in idealized fashion the square-wave output of the zero-reference magnetometer signals appearing on terminal 19 of FIG. 1. The $a$ and $c$ signals were generated in response to easy-direction applied fields equal in magnitude but opposite in polarity or direction. The peak-to-peak amplitudes of the signals are proportional to the applied field magnitudes, while the opposite phase of the $a$ and $c$ signals is indicative of the opposite polarities of the applied fields. The $b$ trace indicates that the sensor output for zero applied field involves no level change. For all three traces, the average signal level corresponds to the quiescent tuning point of the basic sensor.

With continued reference to FIG. 1, the square-wave information signals appearing on terminal 19 may be applied directly to a synchronous detector 18 which also receives via line 17 a reference or control signal at the same frequency as the switching frequency from generator 16. Such detectors are well known in the electronics art and generally include a differential amplifier circuit. The output of the synchronous detector 18 appearing on terminal 13 is a DC level having an amplitude and polarity representative of the external magnetic field environment being measured. This DC level is shown in FIG. 1 as being applied to a DC utilization device 20.

Figure 9:
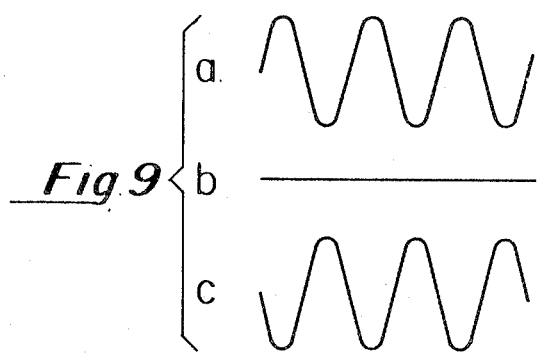
FIG. 9 illustrates the signaL output of the basic sensor of FIG. 1 after filtering and optional amplification, for different conditions of the applied field.

As an alternative, the square-wave signals on terminal 19 of FIG. 1 may be applied to a band-pass filter 22 and to an AC amplifier 24 (which is optional) to generate at terminal 15 the sine waveforms of FIG. 9. The wave traces of $a$, $b$ and $c$ of FIG. 9 correspond to the like-lettered traces of FIG. 8. The $a$ and $c$ traces of FIG. 9 are likewise of opposite phase indicating the reversal of the sense of the applied field. The AC signals are shown applied to an AC utilization device 26. It should be understood that an operative magnetometer system may utilize one or more of the signals available on terminals 13, 15 and 19, depending upon the application. For example, if only the unfiltered square-wave output of FIG. 8 is desired, the remaining circuits such as the synchronous detector, band-pass filter and AC amplifier may be eliminated.

In conclusion, it has been experimentally verified that the present magnetometer output null is stable and occurs with a transducer orientation normal to the known direction of the local ambient field.

What is claimed is:

1. A magnetometer system including a transducer comprised of ferromagnetic material capable of assuming opposed states of residual flux density along a preferred axis of magnetization, said material being initially magnetized substantially in a predetermined one of said states and existing substantially as a single large domain of said predetermined state, said transducer further comprising winding means inductively coupled to said material, means operatively connected to said transducer for sensing the inductance value thereof, said value being dependent upon the external magnetic field environment to which said transducer is subjected, said means for sensing said inductance value being of such a nature that the magnetization state of said material is disturbed but not permanently altered, switching means coupled to said transducer for cyclically applying to said material magnetic fields of sufficient magnitude and proper polarity to switch said material between said predetermined state of residual flux density and the opposite state, the switching of said material producing a modulation of the sensed inductance value of said transducer, the degree and phase of said modulation being indicative of the magnitude and the polarity of said external magnetic field environment, said modulation being absent for the zero external magnetic field condition, thereby providing a zero-field reference for the magnetometer system.

2. A magnetometer system as defined in claim 1 further characterized in that said ferromagnetic material is a thin film of nickel-iron alloy having a thickness of not more than 5,000 Angstrom units.

3. A magnetometer system as defined in claim 1 further characterized in that said winding means includes a winding having its coil axis oriented in a direction transverse to said preferred axis of magnetization, said material being sensitive to a component of said magnetic field environment directed along its preferred axis of magnetization.

4. A magnetometer system as defined in claim 1 wherein said switching means include second winding means inductively coupled to said material, and a source of switching current having preselected repetition frequency, said second winding means being adapted to be energized from said source of switching current, thereby generating said magnetic fields for cyclically switching said material.

5. A magnetometer system comprising in combination at least one ferromagnetic thin film element capable of assuming opposed states of residual flux density along an easy direction of magnetization, said element being initially magnetized in a predetermined one of said states, said element acting substantially as a single large domain of said predetermined state, an inductor winding disposed about said element in such a manner as to link the thin film element magnetic flux in the hard direction of magnetization, capacitive means connected in parallel with said thin film element inductor winding and forming therewith a parallel resonant tank circuit, a source of radiofrequency current, said tank circuit being adapted to be energized from said source of radiofrequency current controlled in amplitude so as to limit the perturbation of the magnetization of said element to small angular rotations incapable of altering said single-domain configuration, said film element and inductor winding comprising a transducer having a total inductance value dependent upon the external magnetic field environment to which said element is subjected along its easy direction of magnetization, switching winding means inductively coupled to said thin film element, a source of switching current, said switching winding means being adapted to be energized from said source of switching current whereby magnetic fields of sufficient magnitude and proper polarity are applied to said thin film element to cyclically switch said element between said predetermined state of residual flux density and the opposite state, the switching of said element producing a modulation of the external-field-dependent total inductance value of said transducer, the degree and phase of said modulation being indicative of the magnitude and polarity of said external magnetic field environment, said modulation being absent for the condition where no easy-direction component of said external magnetic environment is present, thereby establishing a zero-field reference for the magnetometer system.

6. A magnetometer system as defined in claim 5 further characterized in that said thin film element is a nickel-iron alloy composed substantially of 83 percent nickel and 17 percent iron, and having a thickness of approximately 2,000 Angstrom units.

7. A magnetometer system as defined in claim 5 wherein said switching winding means comprise a pair of switching windings disposed with respect to said thin film element so as to link the magnetic flux thereof in the easy direction of magnetization, said source of switching current including a switch signal generator and current-steering means, said signal generator being coupled to said current-steering means and providing a preselected repetition frequency for the operation thereof, said current-steering means being coupled to said pair of windings for causing switching currents to flow alternately therethrough in accordance with said repetition frequency, said pair of windings being poled in such a manner that said switching currents generate respective magnetic fields of opposite polarity.

8. A magnetometer as defined in claim 7 wherein said switch signal generator is a low-frequency square-wave generator, said preselected frequency being of the order of 400 Hz.

9. A magnetometer system as defined in claim 7 further characterized in that said current-steering means includes first and second switching transistors, an inverter transistor and a current source transistor, each of said transistors having an input, output and control electrode, means coupling the output signals of said switch signal generator in common to the control electrodes of said first switching transistor and said inverter transistor, the output electrode of said inverter transistor being connected to the control electrode of said second switching transistor, the input electrodes of said first and second switching transistors and said inverter transistor being connected to a reference potential, a parallel circuit having a pair of branches connected in common at one extremity thereof to the output electrode of said current source transistor and connected at the other extremity thereof respectively to the output electrodes of said first and second transistors, each of said branches comprising in series one of said pair of switching windings and a resistor, capacitive means connected between the output electrodes of said first and second switching transistors, a source of supply potential, resistive voltage divider means coupling the control electrode of said current source transistor to said supply potential, and impedance means coupling respectively the input electrode of said current source and the control electrode of said second switching transistor to said supply potential.

10. A magnetometer system as defined in claim 7 wherein said inductor winding is wound around said thin film element, said pair of switching windings being wound in bifilar fashion at right angles to, and directly over, said inductor winding.

11. A magnetometer system as defined in claim 5 wherein said switching winding means comprises a switching winding inductively coupled to said thin film element, and being so disposed therewith as to link the thin film element magnetic flux in the easy direction of magnetization, said source of switching current including a bidirectional current driver coupled to said switching winding for causing current flow in either direction therethrough.

12. A magnetometer system as defined in claim 5 wherein said switching winding means comprises first and second switching windings inductively coupled to said thin film element, said first and second windings being so disposed therewith as to link the thin film element magnetic flux respectively in the hard and easy directions of magnetization, said source of switching current including a transverse current driver coupled to said first switching winding and a parallel current driver coupled to said second switching winding, said transverse and parallel current drivers causing current flow respectively through said first and second windings in at least partial time coincidence, said parallel current driver being capable of selectively causing current flow in either direction through said second winding, the termination of current flow in said second winding subsequent to the termination of current flow in said first winding causing said thin film element to assume a state of residual flux density determined by the direction of current in said second winding.

13. A magnetometer system as defined in claim 5 further characterized in that said radiofrequency current has a preselected fixed frequency, said parallel resonant tank circuit being detuned from resonance at said fixed frequency, the impedance magnitude of said tank circuit being a function of said total inductance value, the radiofrequency signals derived from said radiofrequency source being of the same frequency as said source and varying in amplitude in response to changes in said tank circuit impedance as indicative of variations in said external field environment, said radiofrequency signals being subjected to said modulation produced by the switching of said thin film element, detector means coupled to said tank circuit for converting said radiofrequency signals to DC level, the output of said detector appearing as a succession of square-wave-type pulses occurring at the switching repetition frequency, the peak-to-peak amplitude of said pulses and the phase thereof providing an indication respectively of the absolute value and direction of the external magnetic field environment sensed by said transducer.

14. A magnetometer system as defined in claim 13 further including a synchronous detector operatively connected to said detector means for converting said pulses to a DC voltage level of corresponding magnitude and polarity, and means for utilizing said DC voltage levels.

15. A magnetometer system as defined in claim 13 further including a band-pass filter operatively connected to said detector means for converting said pulses to sine-wave-type AC signals of corresponding amplitude and phase, means coupled to said filter for amplifying said AC signals, and means for utilizing said AC signals.

* * * * *